United States Patent [19]
Marotti

[11] 4,062,142
[45] Dec. 13, 1977

[54] TRAPPING AND KILLING APPARATUS FOR MICE AND OTHER ANIMALS

[76] Inventor: David Lee Marotti, P.O. Box 33, Earle, Ark. 72331

[21] Appl. No.: 735,095

[22] Filed: Oct. 22, 1976

[51] Int. Cl.² ............................................ A01M 23/18
[52] U.S. Cl. .......................................... 43/61; 43/131
[58] Field of Search .................... 43/58, 60, 61, 67, 73, 43/74, 76

[56] References Cited

U.S. PATENT DOCUMENTS

| | | | |
|---|---|---|---|
| 1,858,096 | 5/1932 | Lementy | 43/58 |
| 3,225,485 | 12/1965 | Powell | 43/67 |

FOREIGN PATENT DOCUMENTS

| | | | |
|---|---|---|---|
| 69,961 | 9/1949 | Denmark | 43/61 |

Primary Examiner—Warner H. Camp
Attorney, Agent, or Firm—John R. Walker, III

[57] ABSTRACT

A hollow, boxlike housing member is provided with an entrance opening for allowing a mouse to enter the interior of the housing member. Bait, such as cheese or the like, is provided on a bridge member of an electrical switch. The electrical switch is adapted so that a mouse will move the bridge member when taking the bait. When the bridge member is so moved, the electric switch will close to cause an electric motor to shut a door which blocks the entrance opening in the housing member thereby trapping the mouse within the interior of the housing member. A container which holds a quantity of poison gas producing substance is attached to the housing member. A pump is operatively coupled with the container to allow a portion of the poison gas producing substance to be introduced into the interior of the housing member to kill any mouse trapped therein.

10 Claims, 7 Drawing Figures

TRAPPING AND KILLING APPARATUS FOR MICE AND OTHER ANIMALS

BACKGROUND OF THE INVENTION

1. Field of the Invention

This invention relates to apparatuses for trapping and killing mice and other animals.

2. Description of the Prior Art

By far the most common device used to trap and kill mice is the spring type trap in which bait such as cheese or the like is placed on a trip member so that when a mouse nibbles on the bait, the trip member will cause a heavy spring to pin the mouse against the body of the trap and, hopefully, instantaneously kill the mouse. Such spring type traps have several disadvantages. For example, such spring type traps are dangerous since they can be accidentally tripped causing injury to young children, pets, and persons attempting to set, move or deactivate the trap. Also, such spring type traps are unsanitary and unpleasant to use. That is, such traps cause blood, germs and the like to be transferred from the mouse to the trap, to the area surrounding the trap, and to the person who removes the mouse from the trap. In addition, such spring type traps are inhumane. That is, such spring type traps often only injure the mouse, or trap the mouse by a foot or tail or the like and therefore cause the mouse to suffer great pain and anxiety.

Various devices have been developed to alleviate various disadvantages of the spring type traps. See, for example, Seeley et al., U.S. Pat. No. 1,139,587; Bales, U.S. Pat. No. 1,294,364; Bronson, U.S. Pat. No. 1,488,312; Lementy, U.S. Pat. No. 1,858,096; Crumrine, U.S. Pat. No. 2,437,507; Price, U.S. Pat. No. 3,548,447; Dosch, U.S. Pat. No. 3,823,504; Petrosky, U.S. Pat. No. 3,900,983. None of these patents disclose, teach or suggest the present invention.

SUMMARY OF THE INVENTION

The present invention is directed towards overcoming the problems and disadvantages of prior apparatuses for trapping and killing mice and other animals. The concept of the present invention is to provide an apparatus for trapping and killing animals which is safe, sanitary and pleasant to use, which humanely kills the animal trapped, and which is relatively inexpensive to make and use.

The apparatus of the present invention includes a hollow, boxlike housing member for holding an animal. An entrance opening is provided in the housing member for allowing an animal to enter the interior thereof. Door means is provided for selectively blocking the entrance opening in the housing member. An electric motor means is provided to cause the door means to move from a first position away from the entrance opening so that an animal can enter the interior of the housing member through the entrance opening, to a second position blocking the entrance opening so that any animal that has entered the interior of the housing member will be trapped therein. The apparatus is provided with a source of electric power for causing the motor means to move the door means from the first position to the second position. An electric circuit means is provided for allowing electric power from the source of electric power to selectively pass to the motor means. Poison means is provided for allowing a poison to be introduced into the interior of the housing member to kill any animal trapped therein.

DESCRIPTION OF THE PREFERRED EMBODIMENT

Figure 1:
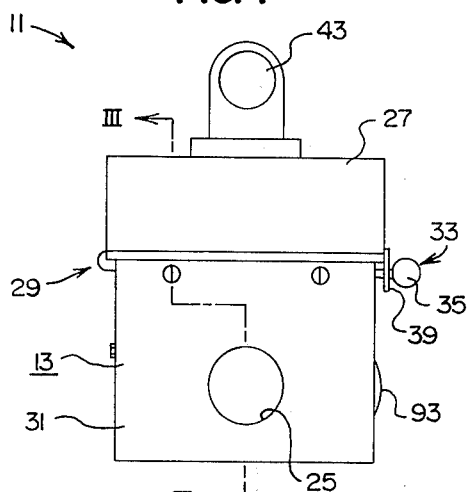
FIG. 1 is a front elevational view of the apparatus of the present invention.

The apparatus 11 is for trapping and killing animals. More specifically, the apparatus 11 is for trapping and killing mice and the like. The apparatus 11 includes, in general, a housing member 13, a door member 15, an electric motor means 17, a source of electric power 19, circuit means 21, and poison means 23.

The housing member 13 is preferably a hollow, box-like structure having an entrance opening 25 therein for allowing a mouse or the like to enter the interior 13' of the housing member 13 therethrough. The housing member 13 may include an openable top portion 27 or the like for allowing access into the interior 13' of the housing member 13. The openable top portion 27 may be pivotally mounted to the remainder of the housing member 13 by means of a hinge-like member 29 (see FIGS. 1, 4 and 6). The hinge-like member 29 may be constructed in any manner apparent to those skilled in the art. For example, the housing member 13 may be constructed of a substantially flexible plastic material or the like and the hinge-like member 29 may consist simply of an integral joint along one side of the housing member 13 between the top portion 27 and the lower portion 31 of the housing member 13 in a manner which should be apparent to those skilled in the art. A lock means 33 may be provided to securely lock the top portion 27 to the lower portion 33 of the housing member 13 in a substantially air-tight manner (see FIGS. 1 and 6). The lock means 33 may consist of a pin-like member 35 which extends through an aperture 37 in a flap-like portion 39 of the top portion 27 of the housing member 13 and through an aperture 41 in the lower portion 31 of the housing member 13. The pin-like member 35 preferably includes a conical wedge-like portion 35' for extending through the apertures 37, 41 in a manner so as to securely wedge the pin-like member 35 in the apertures 37, 41 so as to securely lock the openable top portion 27 of the housing member 13 to the lower portion 31 thereof in a manner which should be apparent to those skilled in the art. Such a lock means 33 will securely lock the top portion 27 to the lower portion 33 of the housing member 13 and will substantially prevent young children and the like from gaining access to the interior 13' of the housing member 13.

Figure 2:
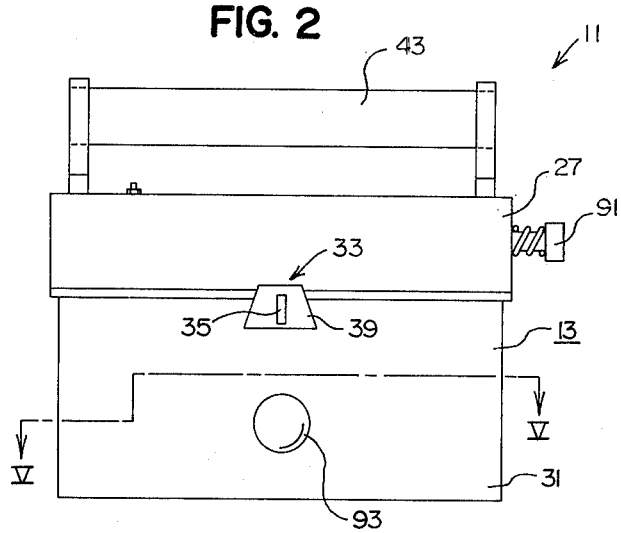
FIG. 2 is a side elevational view thereof.

A handle member 43 (see FIGS. 1 and 2) may be attached to the housing member 13 for allowing the housing member 13 to be easily moved from one location to another. The handle member 43 may be attached to the housing member 13 in any manner apparent to those skilled in the art. For example, the handle member 43 may be secured to the top portion 27 of the housing member 13 by screws or the like (not shown).

Figure 3:
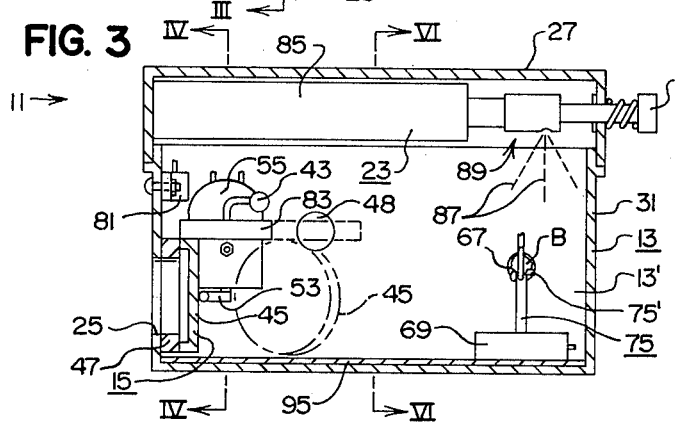
FIG. 3 is a sectional view thereof as taken on line III—III of FIG. 1.
Figure 5:
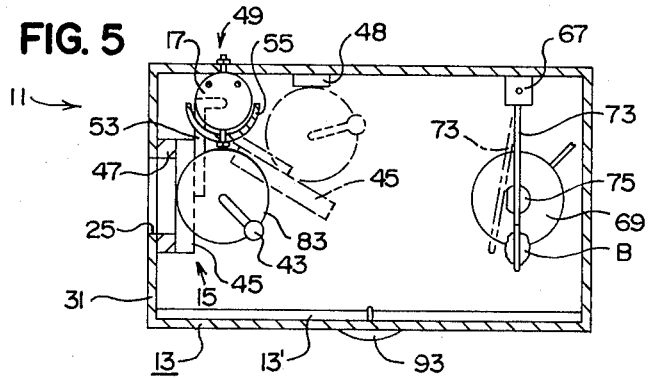
FIG. 5 is a sectional view thereof as taken on line V—V of FIG. 2.

The door member 15 is movable from a first position away from the entrance opening 25 in the housing member 13 as shown in broken lines in FIGS. 3 and 5 to a second position blocking the entrance opening 25 in the housing member 13 as shown by solid lines in FIGS. 3 and 5. When the door means 15 is in the first position away from the entrance opening 25, a mouse or the like can enter the interior 13' of the housing member 13 through the entrance opening 25. On the other hand, when the door means 15 is in the second position, any mouse or the like within the interior 13' of the housing member 13 will be trapped therein. The door means 15 may consist of a metal platelike member 45. A permanent magnet member 47 may be arranged around the entrance opening 25 in the housing member 13 for causing the platelike member 45 of the door means 15 to be substantially sealed thereto when the door means 15 is in the second position. The permanent magnet member 47 may extend completely around the entrance opening 25 and be of a size and shape so as to allow the platelike member 45 of the door means 15 to make a substantially airtight seal therewith. The permanent magnet member 47 may be attached to the housing member 13 adjacent the entrance opening 25 in any manner apparent to those skilled in the art. For example, the permanent magnet member 47 may be glued to the interior 13' of the housing member 13. A stop member 48 (see FIGS. 3 and 5) may be attached to the housing member 13 in the interior 13' thereof located so as to contact the metal platelike member 45 of the door means 15 when the door means 15 is in the first position so that the door means 15 will not have as far to move when moving from the first position to the second position as it would if the stop member 48 was not present thereby reducing the time required for the door means 15 to move from the first position to the second position.

The electric motor means 17 is preferably mounted within the interior 13' of the housing member 13 in any manner apparent to those skilled in the art such as by being bolted onto the housing member 13 as at 49. The motor means 17 includes a rotatable shaft 51 onto which an armlike member 53 is fixedly attached substantially perpendicular thereto. The distal end of the armlike member 53 is fixedly attached to the platelike member 45 of the door means 15 so that when the motor means 17 is activated to cause the shaft 51 to rotate, the armlike member 53 will cause the door means 15 to move from the first position to the second position. The construction of the electric motor means 17 is of a typical construction well known to those skilled in the art.

A shield means 55 may be provided to protect and shield the electric motor means 17. The shield means 55 may be mounted adjacent the motor means 17 in any manner apparent to those skilled in the art. For example, the shield means 55 may be bolted to the motor means 17 as at 57 (see FIG. 4).

The source 19 of electric power preferably consists of battery means 59. The battery means 59 may be mounted in the top portion 27 of the housing member 13 in any manner apparent to those skilled in the art. For example, the battery means 59 may be securely held in place by a spring type means 61 which is, in turn, bolted to the top portion 27 of the housing member 13 as at 63 (see FIGS. 4 and 6).

Figure 6:
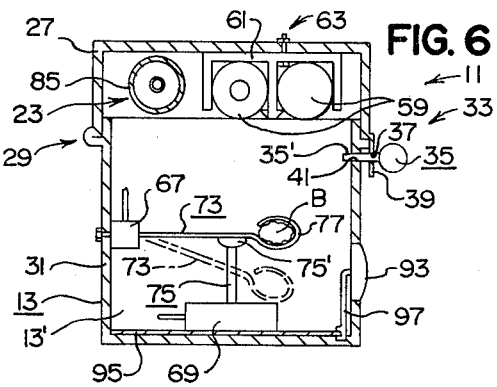
FIG. 6 is a sectional view thereof as taken on line VI—VI of FIG. 3.

The circuit means 21 (see FIG. 7) allows electric power from the source 19 of electric power to selectively pass to the motor means 17. The circuit means 21 may include a normally opened switch means 65 located within the interior 13' of the housing member 13 for normally preventing electric power from passing from the source 19 of electric power to the motor means 17. The normally opened switch means 65 may include first and second contact members 67, 69 spaced apart from one another so as to define a gap 71, and may include a bridge member 73 movable between a first position spaced away from at least one of the first and second contact members 67, 69 so as to prevent electric power from passing through the normally opened switch means 65, and a second position connecting the first and second contact members 67, 69 so as to allow electric power to pass through the normally opened switch means 65. The bridge member 73 is preferably biased toward the second position. The normally opened switch means 65 may include a nonconductive post member 75 for selectively holding the bridge member 73 in the first position. The bridge member 73 preferably includes a bait holding portion 77 for holding a quantity of bait such as cheese or the like to entice a mouse or the like to nibble thereon so as to cause the bridge member 73 to move away from the nonconductive post member 75 and move to the second position thereby allowing electric power to pass from the source 19 of electric power to the motor means 17 so that the motor means 17 will move the door means 15 to the second position whereby the mouse or the like causing the bridge member 73 to move will be trapped within the interior 13' of the housing member 13. Preferably, the first and second contact members 67, 69 of the normally opened switch means 65 are permanent magnet members fixedly attached to the interior 13' of the housing member 13 by glue, screws or the like and in positions substantially as shown in FIGS. 3, 5 and 6. The bridge member 73 preferably consists of an electrically conductive and magnetically attractive metal rodlike member having a loop formed on one end thereof to act as the bait holding portion 77. The post member 75 preferably consists of a rigid rod or the like fixedly mounted on the second contact member 69 in an upstanding position as clearly shown in FIGS. 3 and 6. The nonconductive post member 75 may include a head-like portion 75' for allowing the bridge member 75 to rest thereupon as shown in solid lines in FIGS. 3, 5 and 6. The nonconductive post member 75 may be constructed of a nonconductive plastic material or may consist of a metal rod coated with a nonconductive plastic material or the like. It should be apparent that when a mouse or the like nibbles on the bait B held by the bait holding portion 77 of the bridge member 73, the bridge member 73 will be moved off the head-like portion 75' of the nonconductive post member 75 and will be drawn by the magnetic force of the first and second contact members 67, 69 and by the force of gravity from the first position as shown in solid lines in FIGS. 3, 5 and 6 to the second position as shown in broken lines in FIGS. 5 and 7 to thereby allow electric current to pass through the normally opened switch means 65.

Figure 4:
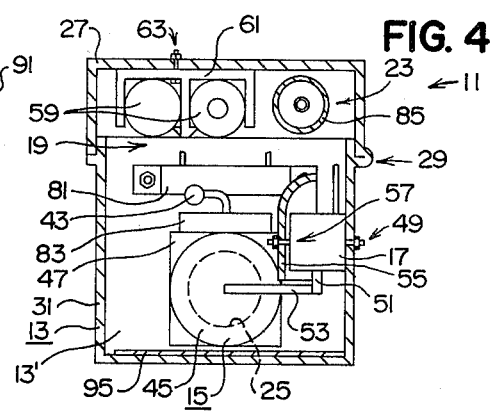
FIG. 4 is a sectional view thereof as taken on line IV—IV of FIG. 3.
Figure 7:
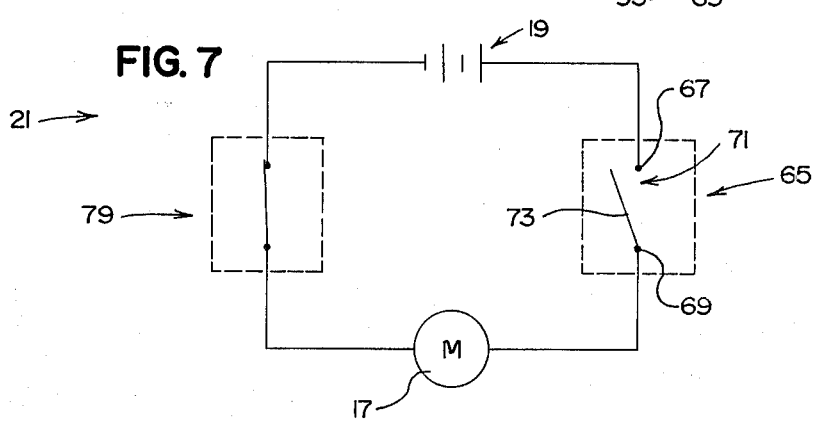
FIG. 7 is a schematic view of the circuit means of the present invention.

The circuit means 21 also may include a normally closed switch means 79 (see FIG. 7). The normally closed switch means 79 is adapted to move to an opened position when the motor means 17 moves the door means 15 to the second position thereby preventing electric power from passing from the source 19 of electric power to the motor means 17. The normally closed switch means 79 preferably consists of a magnetic contact switch 81 interposed between the source 19 of electric power and the electric motor means 17. The magnetic contact switch 81 is of a construction which should be apparent to those skilled in the art. Such a magnetic contact switch is manufactured by Archer, 2715 West Seventh Street, Fort Worth, Texas 76106. A permanent magnet 83 is preferably attached to the metal platelike member 45 of the door means 15 substantially as shown in FIGS. 3, 4 and 5 to cause the magnetic contact switch 81 of the normally closed switch means 79 to move from the closed position to an opened position when the door means 15 is moved to the second position thereby preventing electric power from passing from the source 19 of electric power to the motor means 17 when the door means 15 is in the second position to conserve the power of the battery means 59.

The poison means 23 allows a poison to be introduced into the interior 13' of the housing member 13 to kill any mouse or the like trapped therein. The poison means 23 includes a container member 85 for holding a quantity of poison gas producing substance 87 (see FIG. 3) or the like, and may include a manually activated pump member 89 for allowing a portion of the poison gas producing substance 87 to be pumped into the interior 13' of the housing member 13. The poison gas producing substance 87 preferably is ammonia water or the like. The manually activated pump member 89 preferably is a standard, well-known atomizer device arranged so as to direct a spray of the poison gas producing substance 87 into the interior 13' of the housing member 13. As clearly shown in FIGS. 3, 4 and 6, the container member 85 and the manually activated pump member 89 may be arranged within the openable top portion 27 of the housing member 13. The manually activated pump member 89 preferably includes a plunger-like member 91 located on the exterior of the housing member 13 for allowing the pump member 89 to be activated from the exterior of the housing member 13.

The apparatus 11 may include means for indicating whether a mouse or other animal trapped within the interior 13' of the housing member 13 is dead or alive. This means preferably consist of an indicator means 93 arranged on the exterior of the housing member 13 for indicating the body temperature of a mouse or other animal trapped within the interior 13' of the housing member 13. The indicator means 93 preferably consist of synthetic material which changes color when subject to different temperatures. Such synthetic material is well known to those skilled in the art and is widely used in "Mood Rings" and the like. To transfer body heat from the mouse or other animal to the indicator means 93, an aluminum plate 95 is provided on the floor of the interior 13' of the housing member 13. An attachment member 97 is provided to attach the indicator means 93 to the aluminum plate 95 and to allow heat to be transferred from the aluminum plate 95 to the indicator means 93.

Although the invention has been described and illustrated with respect to a preferred embodiment thereof, it is not to be so limited since changes and modifications may be made therein which are within the full intended scope of the invention.

I claim:

1. An apparatus for trapping and killing animals, said apparatus comprising:

a. a hollow, boxlike housing member for holding an animal, said housing member having an entrance opening for allowing the animal to enter the interior of said housing member therethrough;
b. door means for selectively blocking said entrance opening in said housing member;
c. electric motor means for causing said door means to move from a first position away from said entrance opening so that an animal can enter the interior of said housing member through said entrance opening, to a second position blocking said entrance opening so that any animal within the interior of said housing member will be trapped therein;
d. a source of electric power for causing said motor means to move said door means from said first position to said second position;
e. circuit means for allowing electric power from said source of electric power to selectively pass to said motor means;
f. poison means for allowing a poison to be introduced into the interior of said housing member to kill any animal trapped therein; and
g. means for indicating the body temperature of any animal trapped within the interior of said housing member to thereby indicate whether the animal is dead or alive.

2. The apparatus of claim 1 in which said circuit means includes a normally opened switch means located within the interior of said housing member for normally preventing electric power from passing from said source of electric power to said motor means.

3. The apparatus of claim 2 in which said normally opened switch means includes electrically conductive first and second contact members spaced apart from one another so as to define a gap, and in which said normally opened switch means includes an electrically conductive bridge member movable between a first position spaced away from at least one of said first and second contact members so as to prevent electric power from passing through said normally opened switch means and a second position connecting said first and second contact members so as to allow electric power to pass through said normally opened switch means.

4. The apparatus of claim 3 in which said bridge member of said normally opened switch means is biased towards said second position; in which said normally opened switch means includes a nonconductive post member for selectively holding said bridge member in said first position; and in which said bridge member includes a bait holding portion for enticing an animal to move said bridge member so that said bridge member will be moved away from said post member and will move to said second position thereby allowing electric power to pass to said motor means so that said motor means will move said door means to said second position whereby the animal causing said bridge member to move is trapped within the interior of said housing member.

5. The apparatus of claim 4 in which said circuit means includes a normally closed switch means, said normally closed switch means being adapted to move to an opened position when said motor means moves said door means to said second position thereby preventing electric power from passing from said source of electric power to said motor means.

6. The apparatus of claim 1 in which said poison means includes a container member for holding a quantity of poison gas producing substance and includes a manually activated pump member for allowing a portion of said poison gas producing substance to be pumped into the interior of said housing member.

7. The apparatus of claim 6 in which said poison gas producing substance is ammonia water.

8. A mouse trapping and killing apparatus, said apparatus comprising:
   a. a hollow, boxlike housing member for holding a mouse, said housing member having an entrance opening for allowing the mouse to enter the interior of said housing member, said housing member including an openable top portion for allowing access into the interior of said housing member;
   b. door means for selectively blocking said entrance opening in said housing member to trap the mouse within the interior of said housing member;
   c. electric motor means for causing said door means to move from a first position away from said entrance opening so that a mouse can enter the interior of said housing member through said entrance opening, to a second position blocking said entrance opening so that any mouse within the interior of said housing member will be trapped therein;
   d. battery means attached to said housing member for causing said motor means to move said door means from said first position to said second position;
   e. circuit means extending between said motor means and said battery means for allowing electric power from said battery means to pass to said motor means, said circuit means including a normally opened switch means located within the interior of said housing member for normally preventing electric power from passing from said battery means to said motor means, said normally opened switch means including first and second contact members spaced apart from one another so as to define a gap and including a bridge member movable between a first position spaced away from at least one of said first and second contact members so as to prevent electric power from passing through said normally opened switch means and a second position connecting said first and second contact members so as to allow electric power to pass through said normally opened switch means, said bridge member being biased towards said second position, said normally opened switch means including a nonconductive post member for selectively holding said bridge member in said first position, said bridge member including a bait holding portion for enticing a mouse to move said bridge member so that said bridge member will be moved away from said post member and will move to said second position thereby allowing electric power to pass from said battery means to said motor means so that said motor means will move said door means to said second position whereby the mouse causing said bridge member to move is trapped within the interior of said housing member;
   f. poison means for allowing a poison to be introduced into the interior of said housing member to kill the mouse trapped therein, said poison means including a container member for holding a quantity of poison gas producing substance and including a manually activated pump member for allowing a portion of said poison gas producing substance to be pumped into the interior of said housing means; and
   g. means for indicating the body temperature of any animal trapped within the interior of said housing member to thereby indicate whether the animal is dead or alive.

9. The apparatus of claim 8 in which said circuit means includes a normally closed switch means, said normally closed switch means being adapted to move to an opened position when said motor means moves said door means to said second position thereby preventing electric power from passing from said battery means to said motor means.

10. The apparatus of claim 8 in which said poison gas producing substance is ammonia water.

* * * * *